United States Patent
Wei et al.

(10) Patent No.: US 9,961,590 B2
(45) Date of Patent: May 1, 2018

(54) DATA TRANSMISSION CONTROL METHOD AND APPARATUS BASED ON WIRELESS COMMUNICATIONS NETWORK

(71) Applicant: HUAWEI TECHNOLOGIES CO., LTD., Shenzhen (CN)

(72) Inventors: Anni Wei, Beijing (CN); Zhiming Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 14/950,049

(22) Filed: Nov. 24, 2015

(65) Prior Publication Data
US 2016/0080977 A1    Mar. 17, 2016

Related U.S. Application Data

(63) Continuation of application No. PCT/CN2013/076460, filed on May 30, 2013.

(51) Int. Cl.
*H04W 28/24* (2009.01)
*H04L 12/14* (2006.01)
(Continued)

(52) U.S. Cl.
CPC ......... *H04W 28/24* (2013.01); *H04L 12/1407* (2013.01); *H04M 15/66* (2013.01); *H04W 84/12* (2013.01)

(58) Field of Classification Search
CPC .................................................. H04W 28/24
See application file for complete search history.

(56) References Cited

U.S. PATENT DOCUMENTS

| 8,605,655 | B1 * | 12/2013 | Sahai | H04M 15/66 370/328 |
| 8,615,237 | B2 * | 12/2013 | Baniel | H04M 15/66 455/435.2 |

(Continued)

FOREIGN PATENT DOCUMENTS

| AU | 2011250422 A1 | 7/2013 |
| CA | 2818893 A1 | 11/2011 |

(Continued)

OTHER PUBLICATIONS

International Search Report dated Feb. 27, 2014, in corresponding International Application No. PCT/CN2013/076460.

(Continued)

*Primary Examiner* — Andrew Lai
*Assistant Examiner* — Andrew C Lee
(74) *Attorney, Agent, or Firm* — Staas & Halsey LLP

(57) ABSTRACT

According to a method and apparatus for controlling data transmission in a wireless communications network, a service quality request message is sent to a PCRF when a data request message of a terminal is received; and the PCRF queries a current network status, so as to determine a processing instruction for a data request message of the terminal according to the current network status and the data request message, and process the data request message of the terminal according to the processing instruction. Therefore, processing on the data request message of the terminal not only depends on a parameter carried in the data request message of the terminal, but also uses the current network status as a constraint condition, so that a processing manner for the data request message can be adaptive to a real-time change of the wireless communications network.

20 Claims, 6 Drawing Sheets

(51) Int. Cl.
*H04M 15/00* (2006.01)
*H04W 84/12* (2009.01)

(56) References Cited

U.S. PATENT DOCUMENTS

| | | | | |
|---|---|---|---|---|
| 8,913,494 B1* | 12/2014 | Marupaduga | ......... | H04W 28/24 370/230 |
| 2008/0229385 A1* | 9/2008 | Feder | ...................... | H04L 12/14 726/1 |
| 2008/0273520 A1* | 11/2008 | Kim | ......................... | H04L 47/78 370/345 |
| 2010/0017846 A1* | 1/2010 | Huang | .................... | H04L 12/14 726/1 |
| 2011/0158090 A1* | 6/2011 | Riley | ...................... | H04L 12/14 370/230 |
| 2011/0199903 A1* | 8/2011 | Cuervo | ................. | H04M 15/00 370/235 |
| 2012/0064895 A1* | 3/2012 | Zhang | ................... | H04W 48/16 455/436 |
| 2012/0081557 A1* | 4/2012 | Kupinsky | ........... | H04L 12/1407 348/207.1 |
| 2012/0140665 A1* | 6/2012 | Li | ......................... | H04L 47/781 370/252 |
| 2012/0176894 A1* | 7/2012 | Cai | ........................ | H04L 47/11 370/230 |
| 2012/0196566 A1* | 8/2012 | Lee | ...................... | H04M 15/80 455/408 |
| 2012/0250660 A1* | 10/2012 | Karlsson | ............... | H04W 76/02 370/332 |
| 2012/0281674 A1 | 11/2012 | Jackson et al. | | |
| 2012/0284394 A1* | 11/2012 | Rasanen | .............. | H04L 41/0873 709/224 |
| 2012/0285906 A1* | 11/2012 | Bird | ........................ | A47F 3/002 211/4 |
| 2013/0010751 A1* | 1/2013 | Rydnell | ................ | H04W 36/14 370/331 |
| 2013/0044646 A1* | 2/2013 | Qu | ...................... | H04M 15/765 370/259 |
| 2013/0103846 A1 | 4/2013 | Zhou et al. | | |
| 2013/0142042 A1* | 6/2013 | Garcia Martin | .... | H04L 12/5692 370/230 |
| 2013/0258907 A1 | 10/2013 | Chen et al. | | |
| 2013/0301547 A1* | 11/2013 | Gupta | .................. | H04W 76/048 370/329 |
| 2014/0018063 A1* | 1/2014 | Mattsson | .............. | H04W 12/06 455/423 |
| 2014/0095690 A1* | 4/2014 | Saker | .................. | H04L 65/1033 709/224 |
| 2014/0185490 A1* | 7/2014 | Holm | .................. | H04L 41/0893 370/259 |

FOREIGN PATENT DOCUMENTS

| | | |
|---|---|---|
| CN | 101394291 A | 3/2009 |
| CN | 102143479 A | 8/2011 |
| CN | 102186162 A | 9/2011 |
| CN | 102316444 A | 1/2012 |
| EP | 2592852 A1 | 5/2013 |
| EP | 2629567 A1 | 8/2013 |
| WO | WO 2011137838 A1 | 11/2011 |
| WO | WO 2012003764 A1 | 1/2012 |
| WO | WO 2012152155 A1 | 11/2012 |

OTHER PUBLICATIONS

"3rd Generation Partnership Project; Technical Specification Group Services and System Aspects; Packet-Switched Streaming Service (PSS) Improved Support for Dynamic Adaptive Streaming over HTTP in 3GPP (Release 11)", 3GPP TR 26.938 V0.3.0, Valbonne, France, Aug. 2012, 26 pages.

"3rd Generation Partnership Project; Technical Specification Group Services and System Aspects; Policy and charging control architecture (Release 12)", 3GPP TS 23.203 V12.0.0, Valbonne, France, Mar. 2013, 183 pages.

International Search Report dated Feb. 27, 2014 in corresponding International Patent Application No. PCT/CN2013/076460.

Extended European Search Report dated Apr. 20, 2016 in corresponding European Patent Application No. 13885910.3.

\* cited by examiner

DATA TRANSMISSION CONTROL METHOD AND APPARATUS BASED ON WIRELESS COMMUNICATIONS NETWORK

CROSS-REFERENCE TO RELATED APPLICATIONS

This application is a continuation of International Application No. PCT/CN2013/076460, filed on May 30, 2013, which is hereby incorporated by reference in its entirety.

TECHNICAL FIELD

The present invention relates to the field of wireless communications, and in particular, to a data request processing method and apparatus based on a wireless communications network.

BACKGROUND

With the rapid development of a wireless communications network, various data services are continuously flooding into the wireless communications network by means of the internet. After a bit rate adaptation technology is transplanted from the internet to the wireless communications network, a terminal still performs signal detection, and determines a parameter of requested data according to a detection result. After receiving a data request message of the terminal, a network side provides data for the terminal according to the parameter determined by the terminal. For example, when the terminal requests a video service from the network side, the terminal determines a bit rate of a requested video according to detected signal strength of a cell. When detecting that the signal strength of the cell is relatively strong, the terminal requests a high-definition video, and after receiving a request message of the terminal, the network side provides the high-definition video for the terminal; or when detecting that the signal strength of the cell is relatively weak, the terminal requests a standard-definition video, and after receiving a request message of the terminal, the network side provides the standard-definition video for the terminal.

Compared with the internet, a communication environment of a wireless communications network changes frequently and sharply. For this reason, a terminal cannot obtain a change of a wireless network environment in real time. Therefore, an existing method for processing a data request message of a terminal by a network side is not appropriate for a wireless communications network. For example, the wireless communications network suddenly enters a critical state of congestion, but the terminal does not obtain this in time; therefore, when a high-definition video is requested, a network layer still provides the high-definition video for the terminal, which is undoubtedly easy to cause congestion of the wireless communications network.

SUMMARY

In view of this, embodiments of the present invention provide a data request processing method and apparatus based on a wireless communications network, so as to solve a problem that an existing method for processing a data request message of a terminal by a network side is not appropriate for a wireless communications network.

To achieve the foregoing objective, the embodiments of the present invention provide the following technical solutions.

According to a first aspect of the embodiments of the present invention, a data request processing method based on a wireless communications network is provided, including: sending a service quality request message to a PCRF when a data request message of a terminal is received; acquiring a data request processing instruction, where the data request processing instruction is determined according to a current network status and the data request message, and the current network status is obtained by means of querying by the PCRF according to the received service quality request message; and processing a data request message of the terminal according to the data request processing instruction.

In a first implementation manner of the first aspect of the present invention, the acquiring a data request processing instruction includes: receiving the data request processing instruction sent from the PCRF.

In a second implementation manner of the first aspect of the present invention, the acquiring a data request processing instruction includes: receiving a message that indicates the current network status and is sent from the PCRF; and determining the data request processing instruction according to the current network status and a data parameter that is carried in the data request message.

According to a second aspect of the embodiments of the present invention, a data request processing method based on a wireless communications network is provided, is applied to a PCRF in the wireless communications network, and includes: receiving a service quality request message, where the service quality request message is sent from a sending party when the sending party receives a data request message of a terminal; and querying a current network status according to the service quality request message, so as to acquire a data request processing instruction according to the current network status and process a data request message of the terminal according to the data request processing instruction.

In a first implementation manner of the second aspect of the present invention, the method further includes: determining the data request processing instruction according to the current network status and a data parameter that is carried in the data request message sent from the sending party; and sending the data request processing instruction to the sending party.

In a second implementation manner of the second aspect of the present invention, the method further includes: sending the current network status to the sending party.

According to a third aspect of the embodiments of the present invention, a data request processing apparatus based on a wireless communications network is provided, including: a first sending module, configured to send a service quality request message to a PCRF when a data request message of a terminal is received; an instruction acquiring module, configured to acquire a data request processing instruction, where the data request processing instruction is determined according to a current network status and the data request message, and the current network status is obtained by means of querying by the PCRF according to the received service quality request message; and a processing module, configured to process a data request message of the terminal according to the data request processing instruction.

In a first implementation manner of the third aspect of the present invention, the instruction acquiring module includes: a first receiving unit, configured to receive the data request processing instruction sent from the PCRF.

In a second implementation manner of the third aspect of the present invention, the instruction acquiring module includes: a second receiving unit, configured to receive a message that indicates the current network status and is sent from the PCRF; and an instruction determining unit, configured to determine the data request processing instruction according to the current network status and a data parameter that is carried in the data request message.

According to a fourth aspect of the embodiments of the present invention, a data request processing apparatus based on a wireless communications network is provided, is applied to a PCRF in the wireless communications network, and includes: a second receiving module, configured to receive a service quality request message, where the service quality request message is sent from a sending party when the sending party receives a data request message of a terminal; and a network status querying module, configured to query a current network status according to the service quality request message.

In a first implementation manner of the fourth aspect of the present invention, the apparatus further includes: an instruction determining module, configured to determine a data request processing instruction according to the current network status and a data parameter that is carried in the data request message sent from the sending party; and a second sending module, configured to send the data request processing instruction to the sending party.

In a second implementation manner of the third aspect of the present invention, the apparatus further includes: a third sending module, configured to send the current network status to the sending party.

According to the data request processing method and apparatus based on a wireless communications network provided in the embodiments of the present invention, a service quality request message is sent to a PCRF when a data request message of a terminal is received; and the PCRF queries a current network status, where the current network status is used to determine a processing instruction for a data request message of the terminal, and the processing instruction is a basis for processing the data request message of the terminal. Therefore, processing on the data request message of the terminal not only depends on a parameter carried in the data request message of the terminal, but also uses the current network status as a constraint condition, so that a processing manner for the data request message can be adaptive to a real-time change of the wireless communications network.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention disclose a data request processing method and apparatus based on a wireless communications network, where a core invention point of the method and the apparatus lies in that: when a data request message of a terminal is received, a current network status is acquired from a policy and charging rules function entity (Policy and Charging Rules Function, PCRF) on a wireless communications network side, so as to determine a data request processing instruction and process a data request message of the terminal. Therefore, a processing manner for the data request message can be determined according to a network status of the wireless communications network, so that the network status of the wireless communications network can be used in real time during data transmission.

Figure 1:
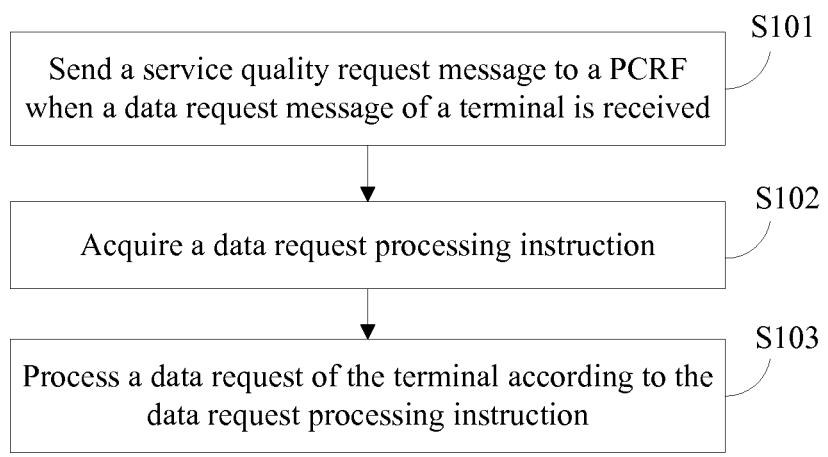
FIG. 1 is a flowchart of a data request processing method based on a wireless communications network according to an embodiment of the present invention.

As shown in FIG. 1, a data request processing method based on a wireless communications network according to an embodiment of the present invention may include the following steps.

S101: Send a service quality request message to a PCRF when a data request message of a terminal is received.

S102: Acquire a data request processing instruction.

In this embodiment, the data request processing instruction is determined according to a current network status, and the current network status is obtained by means of querying by the PCRF according to the received service quality request message.

Specifically, a specific implementation manner of this step may include: receiving the data request processing instruction sent from the PCRF.

That is, after receiving the service quality request message, the PCRF queries the current network status; determines the data request processing instruction according to the current network status and a data parameter that is carried in the data request message sent from a sending party of the data request message; and sends the data request processing instruction to the sending party of the service quality request message.

Alternatively, another specific implementation manner of this step may include: receiving a message that indicates the current network status and is sent from the PCRF; and determining the data request processing instruction according to the current network status and a data parameter that is carried in the data request message.

That is, when receiving the service quality request message, the PCRF queries the current network status and sends the current network status to a sending party of the service quality request message; and the sending party of the service quality request message determines the data request processing instruction according to the current network status.

No matter which party determines the data request processing instruction, if current network traffic of a cell in which the terminal is located is greater than a preset congestion threshold, it indicates that usage of resources of the cell tends to be saturated, and then, the data request processing instruction is determined as: an instruction for instructing to request data whose preset bit rate is less than a bit rate carried in the data request message, or an instruction for instructing to switch a data transmission channel to a wireless local area network.

S103: Process a data request message of the terminal according to the data request processing instruction.

If content of the data request processing instruction determined in S102 is: requesting the data whose preset bit rate is less than the bit rate carried in the data request message, in S103, data whose bit rate is the preset bit rate is requested from a server, and the data whose bit rate is the preset bit rate and sent from the server is forwarded to the terminal by using a gateway. In the prior art, the server is generally used to receive the data request message of the terminal forwarded by the gateway; respond to the data request message; and send data requested by the terminal to the terminal.

The method described in this embodiment may be implemented by an apparatus independently disposed on a network side of a wireless communications network, or may be implemented by a newly added function module integrated in a gateway of a wireless communications network.

In the prior art, when a terminal requests a data service from a wireless communications network, generally, the terminal determines a data parameter according to a network environment in which the terminal is located. For example, when the terminal requests a video service from the wireless communications network, the terminal determines a bit rate of a video according to a current network environment. However, generally an air interface of the wireless communications network changes frequently and sharply, so that the terminal cannot obtain a change of a wireless air interface in real time. Therefore, a parameter determined by the terminal cannot be adaptive to a current network status in real time. For example, a cell in which the terminal is located enters a critical state of congestion, but the terminal does not obtain the change in the status of the cell and still requests a high-definition video from the wireless communications network. In this case, congestion of the cell is caused.

However, according to the method described in this embodiment, when a data request message of a terminal is received by a wireless communications network, the data request message is not processed directly, instead, the data request message is used as a trigger condition to trigger sending of a service quality request message to a PCRF; a current network status is acquired, and the current network status is used as a basis to determine a data request processing instruction; and a data request message of the terminal is processed according to the data request processing instruction. It can be learned that, processing on the data request message of the terminal is no longer based on only a data parameter carried in the data request message sent from the terminal, but also based on the current network status. Therefore, processing on a data service requested by the terminal can be adaptive to the current network status.

Figure 2:
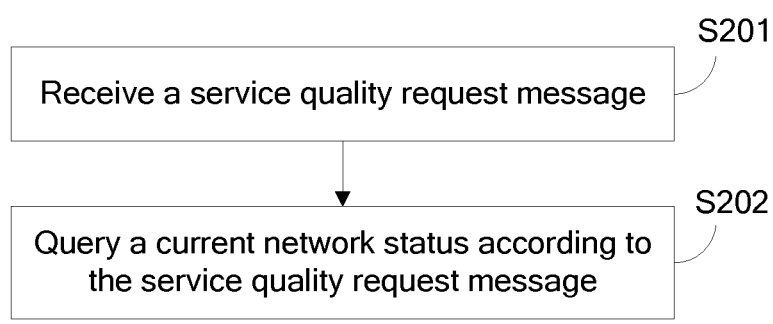
FIG. 2 is a flowchart of another data request processing method based on a wireless communications network according to an embodiment of the present invention.

Corresponding to the foregoing embodiment, as shown in FIG. 2, another data request processing method based on a wireless communications network according to an embodiment of the present invention is applied to a PCRF in the wireless communications network and may include the following steps.

S201: Receive a service quality request message.

The service quality request message is sent from a sending party when the sending party receives a data request message of a terminal.

S202: Query a current network status according to the service quality request message, so as to acquire a data request processing instruction according to the current network status and process a data request message of the terminal according to the data request processing instruction.

Specifically, the PCRF may determine the data request processing instruction according to the current network status and a data parameter that is carried in the data request message sent from the sending party, and send the data request processing instruction to the sending party of the data request message; or the PCRF may send the current network status to the sending party of the service quality request message, and the sending party determines the data request processing instruction according to the current network status and a data parameter that is carried in the data request message, and processes the data request message of the terminal according to the data request processing instruction. For a specific process of determining the data request processing instruction by the sending party, reference is made to the description in the foregoing embodiment, and details are not described herein.

In this embodiment, determining the data request processing instruction according to the current network status and the data parameter that is carried in the data request message sent from the sending party specifically includes: if current network traffic of a cell in which the terminal is located is greater than a preset congestion threshold, determining an instruction for instructing to request data whose preset bit rate is less than a bit rate carried in the data request message as the data request processing instruction; or if current network traffic of a cell in which the terminal is located is greater than a preset congestion threshold, determining an instruction for instructing to switch a data transmission channel to a wireless local area network as the data request processing instruction.

According to the method described in this embodiment, a PCRF of a wireless communications network queries a network status so as to determine a processing instruction of a data request message of a terminal, so that processing on a data request can be adaptive to a status of the wireless communications network.

In the following, video data is used as an example to describe in detail the methods described in the foregoing embodiments.

Figure 3:
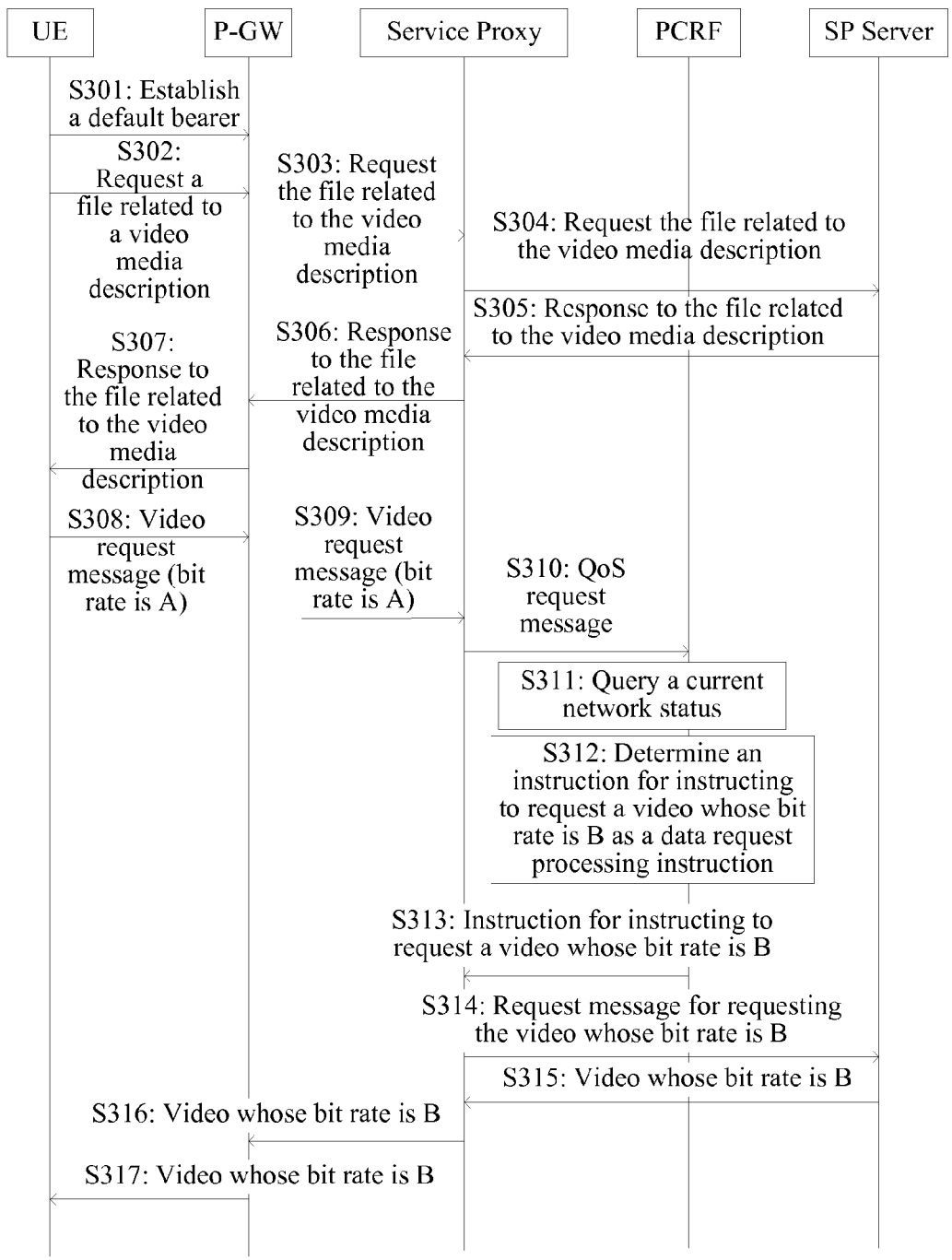
FIG. 3 is a flowchart of still another data request processing method based on a wireless communications network according to an embodiment of the present invention.

A data request processing method based on a wireless communications network according to an embodiment of the present invention is applied in the following scenario: A service node Service Proxy is added in the wireless communications network, and the method shown in FIG. 1 is executed by the newly added service node service proxy, where the service proxy may be connected to a PCRF through an Rx interface. As shown in FIG. 3, the method may include the following steps.

S301: Establish a default bearer between a terminal (User Equipment, UE) and a packet data network gateway (PDN Gateway, P-GW).

S302: The UE requests, from a server SP server, a file related to a video media description.

S303: After detecting a request of the UE, the P-GW forwards the request to the Service Proxy.

S304: After receiving the file related to the video media description, the Service Proxy detects a video service event and forwards, to the SP server, the file related to the video media description.

S305: The SP server returns a response to the file related to the video media description.

S306: The Service Proxy forwards, to the P-GW, the response to the file related to the video media description.

S307: The P-GW forwards, to the UE, the response to the file related to the video media description.

S308: The UE sends a video request message to the P-GW, where a bit rate of a requested video file may be A.

S309: The P-GW forwards the video request message of the UE to the Service Proxy.

S310: After receiving the video request message of the UE, the Service Proxy sends a QoS request message to the PCRF.

Parameters such as a video length, definition, and a bit rate that are requested are generally carried in the QoS request message.

Specifically, the Service proxy may provide service information for the PCRF and request a control policy by using an AAR message, where a format of the AAR message is as follows:

```
<AA-Request> ::= < Diameter Header: 265, REQ, PXY >
< Session-Id >
{ Auth-Application-Id }
{ Origin-Host }
{ Origin-Realm }
{ Destination-Realm }
[ Destination-Host ]
[ IP-Domain-Id ]
[ AF-Application-Identifier ]
*[ Media-Component-Description ]
[ Service-Info-Status ]
[ AF-Charging-Identifier ]
[ SIP-Forking-Instruction ]
*[ Specific-Action ]
*[ Subscription-Id ]
*[ Supported-Features ]
[ Reservation-Priority ]
[ Framed-IP-Address ]
[ Framed-IPv6-Prefix ]
[ Called-Station-Id ]
[ Service-URN ]
[ Sponsored-Connectivity-Data ]
```

-continued

```
[ MPS-Identifier ]
[ Rx-Request-Type ]
*[ Required-Access-Info ]
[ Origin-State-Id ]
*[ Proxy-Info ]
*[ Route-Record ]
*[ AVP ]
```

The Service proxy provides video-related service information in Media-Component-Description AVP. Media-Component-Description AVP needs to be extended, and [Media-Bitrate-Suggestion] that is used to indicate information about a bit rate suggested by the PCRF is added.

A format of Media-Component-Description AVP is:

```
Media-Component-Description ::= < AVP Header: 517 >
{ Media-Component-Number }; Ordinal number of the media comp.
*[ Media-Sub-Component ]; Set of flows for one flow identifier
[ AF-Application-Identifier ]
[ Media-Type ]
[ Max-Requested-Bandwidth-UL ]
[ Max-Requested-Bandwidth-DL ]
[ Min-Requested-Bandwidth-UL ]
[ Min-Requested-Bandwidth-DL ]
[ Media-Bitrate-Suggestion ]
[ Flow-Status ]
[ Reservation-Priority ]
[ RS-Bandwidth ]
[ RR-Bandwidth ]
*[ Codec-Data ]
```

S311: After receiving the QoS request message, the PCRF queries a current network status.

S312: If the PCRF determines that current network traffic of a cell in which the terminal is located is greater than a preset congestion threshold, the PCRF determines an instruction for instructing to request a video whose bit rate is a preset bit rate as a data request processing instruction.

The preset bit rate is less than a bit rate carried in the video request message.

The PCRF may determine information about used and unused resources in a same cell according to an ID of the UE and an ID of the cell, so as to determine, according to a set congestion threshold, whether the cell is congested; or the PCRF may distinguish different applications and distinguish different instances of a same application type according to application types and application ID information. It is assumed that APP2 is a video service type, the PCRF sets that 30% resources are allocated to a video service in a same cell, and sets a congestion threshold. If resource occupied by a video service in a same cell reaches the set congestion threshold, it is considered that there is no enough resource to be provided for a video service of this type.

S313: The PCRF sends an instruction for instructing to request a video whose bit rate is B to the Service Proxy.

Specifically, the PCRF gives, according to service information and user information, a corresponding instruction to a video stream in AAA answer Media-Component-Description AVP.

A format of an AAA message is as follows:

```
< AA-Answer > ::= < Diameter Header: 265, PXY >
< Session-Id >
{ Auth-Application-Id }
{ Origin-Host }
{ Origin-Realm }
```

```
[ Result-Code ]
[ Experimental-Result ]
*[ Access-Network-Charging-Identifier ]
[ Access-Network-Charging-Address ]
[ Acceptable-Service-Info ]
[ IP-CAN-Type ]
[ RAT-Type ]
*[ Flows ]
*[ Supported-Features ]
*[ Class ]
[ Error-Message ]
[ Error-Reporting-Host ]
*[ Failed-AVP ]
[ Origin-State-Id ]
*[ Redirect-Host ]
[ Redirect-Host-Usage ]
[ Redirect-Max-Cache-Time ]
*[ Proxy-Info ]
*[ AVP ]
```

S314: The Service Proxy sends a message for requesting the video whose bit rate is B to the SP server.

S315: The SP server returns the video whose bit rate is B to the Service Proxy.

S316: The Service Proxy forwards the video whose bit rate is B to the P-GW.

S317: The P-GW forwards the video whose bit rate is B to the UE.

In this embodiment, in addition to reducing a bit rate of a required video, the Service Proxy may refuse a video request, and a specific process is as follows.

When network resources are not enough to provide a video service for a user, 3xx state returned by using HTTP in the prior art may be used or extended to indicate or define new HTTP state code that is used to indicate a network status. For example, 601 indicates that a network is congested and cannot support a service, and is used to refuse a video request of a terminal.

According to the method described in this embodiment, a newly added Service Proxy interacts with a PCRF, so that a current network status can be acquired, and a data request processing manner can be determined. Therefore, when a network cannot support data requested by a terminal, an adjustment can be made on a network side in time, so that a data transmission process can be adaptive to a network status.

It should be noted that, in the method described in this embodiment, a function implemented by the service node Service Proxy may be implemented by a gateway in an existing wireless communications network, that is, an existing gateway is improved to implement the function of the Service Proxy on a basis of implementing a gateway function. In this embodiment, a purpose of using a newly added service node lies in that: determining a data request according to a status of a wireless communications network can be implemented by using only a newly added service node in the existing wireless communications network without a need of changing another device.

Figure 4:
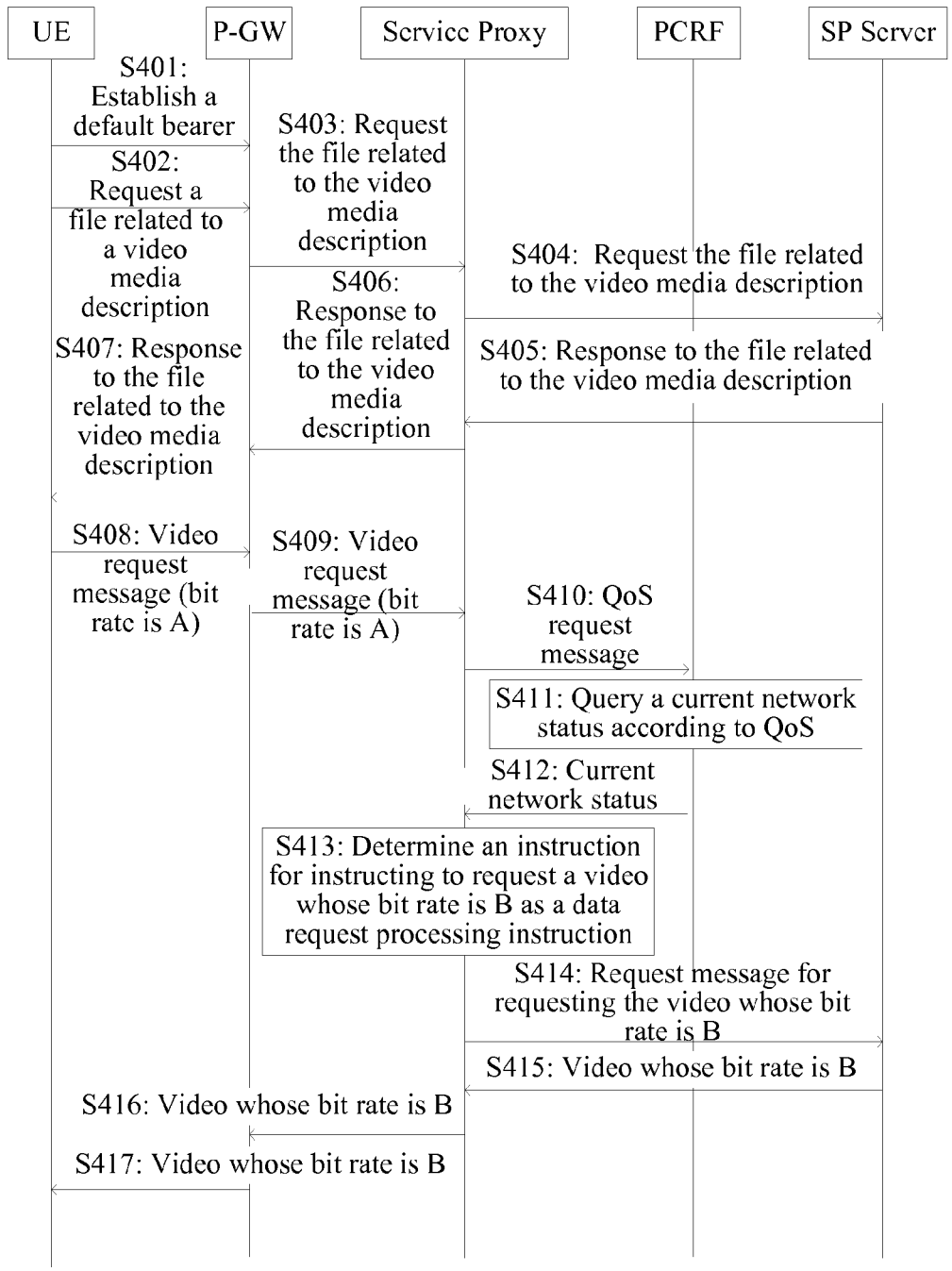
FIG. 4 is a flowchart of yet another data request processing method based on a wireless communications network according to an embodiment of the present invention.

Another data request processing method based on a wireless communications network according to an embodiment of the present invention is applied in the following scenario: A service node Service Proxy is added in the wireless communications network, and the method shown in FIG. 1 is executed by the newly added service node Service Proxy. As shown in FIG. 4, the method may include the following steps.

S401: Establish a default bearer between a terminal (User Equipment, UE) and a packet data network gateway (PDN Gateway, P-GW).

S402: The UE requests, from a server SP server, a file related to a video media description.

S403: After detecting a request of the UE, the P-GW forwards the request to the Service Proxy.

S404: After receiving the file related to the video media description, the Service Proxy detects a video service event and forwards, to the SP server, the file related to the video media description.

S405: The SP server returns a response to the file related to the video media description.

S406: The Service Proxy forwards, to the P-GW, the response to the file related to the video media description.

S407: The P-GW forwards, to the UE, the response to the file related to the video media description.

S408: The UE requests video data.

S409: The P-GW forwards a video request message of the UE to the Service Proxy.

S410: After receiving the video request message of the UE, the Service Proxy sends a QoS request message to a PCRF.

S411: After receiving the QoS request message, the PCRF queries a current network status.

S412: The PCRF sends the current network status to the Service Proxy.

S413: If the Service Proxy determines that current network traffic of a cell in which the terminal is located is greater than a preset congestion threshold, the Service Proxy determines an instruction for instructing to request a video whose bit rate is a preset bit rate B as a data request processing instruction.

The preset bit rate is less than a bit rate carried in the data request message.

S414: The Service Proxy requests the video whose bit rate is B from the SP server.

In this embodiment, specifically, the Service Proxy may implement, by extending a URL of an HTTP request, requesting the video whose bit rate is B from the SP server, where a method is as follows: A network adds corresponding parameter information into the URL, so as to give an instruction related to a network status, for example, a bit rate change instruction in a congestion scenario in this embodiment.

Specific implementation is as follows:

http://Server.example.com /media_A.mp4?Networkstate=LightCongestion, SuggestBitrate=B.

Inserted parameter information needs to be expressed by using a WebAPI description language (such as WADL: Web Application Description Language), so that a network entity can normally parse the inserted parameter information.

S415: The SP server returns the video whose bit rate is B to the Service Proxy.

In this embodiment, the SP server may add URL information into which a network parameter is inserted to an HTTP answer message by using a Content-Location header field, where the URL information is used to notify a client that a bit rate is changed due to network congestion.

Specific implementation is as follows:

```
Content-Location:http://Server.example.com/media_A.mp4?
Networkstate=LightCongestion, SuggestBitrate=B.
```

S416: The Service Proxy forwards the video whose bit rate is B to the P-GW.

S417: The P-GW forwards the video whose bit rate is B to the UE.

It should be noted that, the foregoing description is based on that a specific case of a network status is that the current network traffic of the cell in which the terminal is located is greater than the preset congestion threshold. In addition, if the current network status is that the network traffic of the cell in which the terminal is located is not greater than the preset congestion threshold, that is, the current cell can support data requested by the terminal, the Service Proxy can directly forward a video request message to the SP server. For the PCRF shown in FIG. 3, a determined data request processing instruction may be used to process a video request of the terminal according to the video request message.

According to the method described in this embodiment, a Service Proxy has a function of processing a date request of a terminal according to a current network status, so that a response to data requested by the terminal can be more adaptive to a characteristic of a wireless network environment change.

Figure 5:
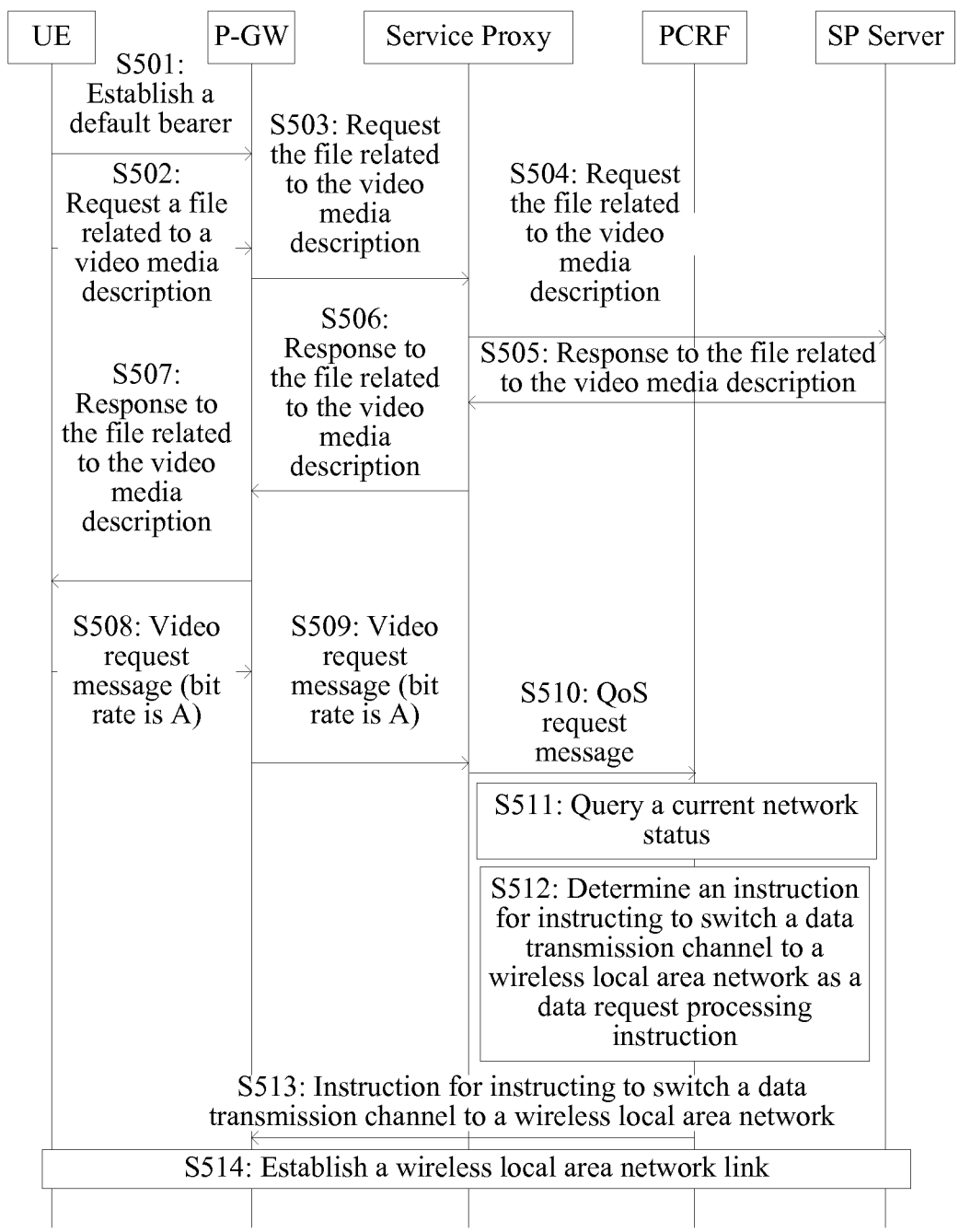
FIG. 5 is a flowchart of still yet another data request processing method based on a wireless communications network according to an embodiment of the present invention.

Still another data request processing method based on a wireless communications network according to an embodiment of the present invention is applied in the following scenario: A service node Service Proxy is added in the wireless communications network, and the method shown in FIG. 1 is executed by the newly added service node Service Proxy. As shown in FIG. 5, the method may include the following steps.

S501: Establish a default bearer between a terminal (User Equipment, UE) and a packet data network gateway (PDN Gateway, P-GW).

S502: The UE requests, from a server SP server, a file related to a video media description.

S503: After detecting a request of the UE, the P-GW forwards the request to the Service Proxy.

S504: After receiving the file related to the video media description, the Service Proxy detects a video service event and forwards, to the SP server, the file related to the video media description.

S505: The SP server returns a response to the file related to the video media description.

S506: The Service Proxy forwards, to the P-GW, the response to the file related to the video media description.

S507: The P-GW forwards, to the UE, the response to the file related to the video media description.

S508: The UE requests video data.

S509: The P-GW forwards a video request message of the UE to the Service Proxy.

S510: After receiving the video request message of the UE, the Service Proxy sends a QoS request message to a PCRF.

S511: After receiving the QoS request message, the PCRF queries a current network status.

S512: If the PCRF determines that current network traffic of a cell in which the terminal is located is greater than a preset congestion threshold, the PCRF determines an instruction for instructing to switch a data transmission channel to a wireless local area network as a data request processing instruction.

S513: The PCRF sends the instruction for instructing to switch a data transmission channel to a wireless local area network.

In this embodiment, the PCRF may acquire an access manner, such as LTE or WLAN, of the UE from the P-GW. After the PCRF acquires service information from the Server Proxy, with reference to information of a user, if the PCRF determines that a wireless network in which the UE is currently located cannot provide a service requested by the UE, a handover from LTE to WLAN is executed. The PCRF may send a handover instruction to the P-GW. The handover instruction can be carried by extending AVP of a CCA message sent from the PCRF to the P-GW.

A specific format of the message is:

```
Radio_Access_Technology_Handover :: = < AVP Header:xxxx>
[RAT-Type-original]
[RAT-Type-Target]
*[AVP]
```

Specifically, the PCRF may send the instruction to the Service Proxy, and then the Service Proxy forwards the instruction to the gateway; or the PCRF may directly send the instruction to the gateway.

S514: The P-GW establishes a wireless local area network link to the UE and uses the wireless local area network to transmit data requested by the UE.

According to the method described in this embodiment, when a network cannot support a data request of a UE, a data transmission channel is switched to a wireless local area network, so as to avoid increasing a burden on a wireless communications network.

Figure 6:
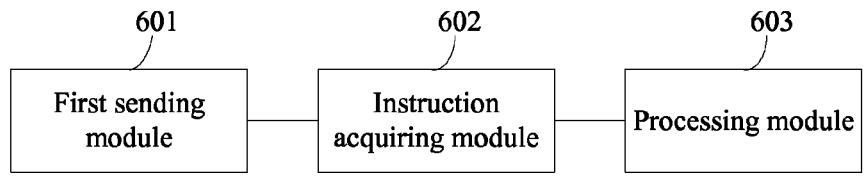
FIG. 6 is a schematic structural diagram of a data request processing apparatus based on a wireless communications network according to an embodiment of the present invention.

As shown in FIG. 6, a data request processing apparatus based on a wireless communications network according to an embodiment of the present invention may include: a first sending module 601, configured to send a service quality request message to a PCRF when a data request message of a terminal is received; an instruction acquiring module 602, configured to acquire a data request processing instruction, where the data request processing instruction is determined according to a current network status and the data request message, and the current network status is obtained by means of querying by the PCRF according to the received service quality request message; and a processing module 603, configured to process a data request message of the terminal according to the data request processing instruction.

Figure 7:
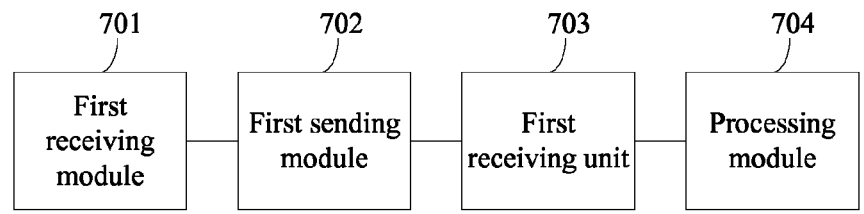
FIG. 7 is a schematic structural diagram of another data request processing apparatus based on a wireless communications network according to an embodiment of the present invention.

As shown in FIG. 7, another data request processing apparatus based on a wireless communications network according to an embodiment of the present invention may include: a first receiving module 701, configured to receive a data request message of a terminal; a first sending module 702, configured to send a service quality request message to a PCRF when the data request message of the terminal is received; a first receiving unit 703, configured to receive a data request processing instruction sent from the PCRF, where the data request processing instruction is determined according to a current network status and the data request message, and the current network status is obtained by means of querying by the PCRF according to the received service quality request message; and a processing module 704, configured to process a data request message of the terminal according to the data request processing instruction.

The apparatus described in this embodiment may be disposed on a network side of a wireless communications network and used as a newly added service node of the network side, and is connected to the PCRF through an Rx interface.

Figure 8:
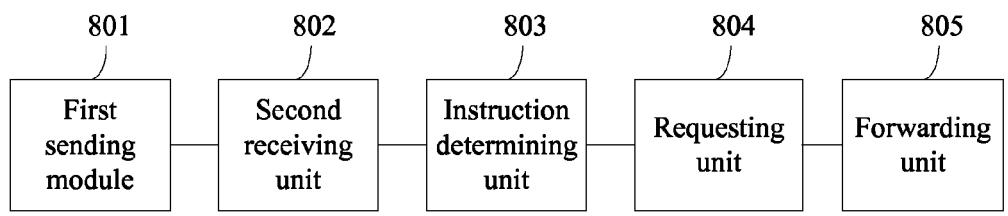
FIG. 8 is a schematic structural diagram of still another data request processing apparatus based on a wireless communications network according to an embodiment of the present invention.

As shown in FIG. 8, still another data request processing apparatus based on a wireless communications network according to an embodiment of the present invention may include: a first sending module 801, a second receiving unit 802, an instruction determining unit 803, a requesting unit 804 and a forwarding unit 805.

The first sending module 801 is configured to send a service quality request message to a PCRF when a data request message of a terminal is received.

The second receiving unit 802 is configured to receive a message that indicates a current network status and is sent from the PCRF.

The instruction determining unit 803 is configured to determine a data request processing instruction according to the current network status.

The instruction determining unit may further include: a bit rate determining subunit, configured to: if current network traffic of a cell in which the terminal is located is greater than a preset congestion threshold, determine an instruction for instructing to request data whose preset bit rate is less than a bit rate carried in the data request message as the data request processing instruction, or a transmission channel determining subunit, configured to: if current network traffic of a cell in which the terminal is located is greater than a preset congestion threshold, determine an instruction for instructing to switch a data transmission channel to a wireless local area network as the data request processing instruction.

The requesting unit 804 is configured to: when the instruction for instructing to request the data whose preset bit rate is less than the bit rate carried in the data request message is determined as the data request processing instruction, request, from a server, data whose bit rate is the preset bit rate.

The forwarding unit 805 is configured to forward the data whose bit rate is the preset bit rate to the terminal by using a gateway, where the data is sent from the server.

The apparatuses described in FIG. 6 and FIG. 8 may be function nodes disposed in a wireless communications network, or may be newly added function modules in a gateway in a wireless communications network. Functions of the apparatuses lie in that processing on a data request message of a terminal can be adaptive to a real-time change of a network environment.

Figure 9:
FIG. 9 is a schematic structural diagram of yet another data request processing apparatus based on a wireless communications network according to an embodiment of the present invention.

As shown in FIG. 9, yet another data request processing apparatus based on a wireless communications network according to an embodiment of the present invention is applied to a PCRF in the wireless communications network and may include: a second receiving module 901, configured to receive a service quality request message, where the service quality request message is sent from a sending party when the sending party receives a data request message of a terminal; and a network status querying module 902, configured to query a current network status according to the service quality request message, where the current network status is used to acquire a data request processing instruction, and the data request processing instruction is a basis for the sending party to process a data request message of the terminal.

Figure 10:
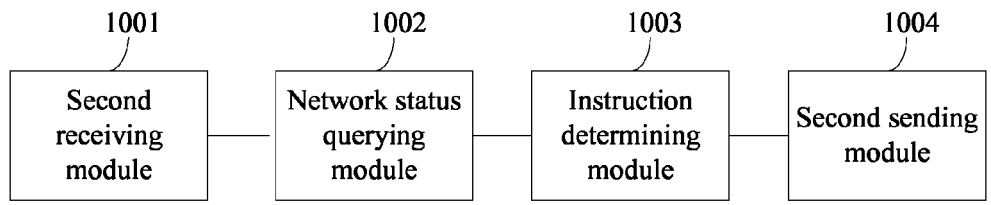
FIG. 10 is a schematic structural diagram of still yet another data request processing apparatus based on a wireless communications network according to an embodiment of the present invention.

As shown in FIG. 10, yet still another data request processing apparatus based on a wireless communications network according to an embodiment is applied to a PCRF in the wireless communications network and may include: a second receiving module 1001, a network status querying module 1002, an instruction determining module 1003 and a second sending module 1004.

The second receiving module 1001 is configured to receive a service quality request message, where the service quality request message is sent from a sending party when the sending party receives a data request message of a terminal.

The network status querying module 1002 is configured to query a current network status according to the service quality request message.

The instruction determining module 1003 is configured to determine a data request processing instruction according to the current network status and a data parameter that is carried in the data request message sent from the sending party.

Specifically, the instruction determining module may further include: a bit rate determining unit, configured to: if current network traffic of a cell in which the terminal is located is greater than a preset congestion threshold, determine an instruction for instructing to request data whose preset bit rate is less than a bit rate carried in the data request message as the data request processing instruction, or a transmission channel determining unit, configured to: if current network traffic of a cell in which the terminal is located is greater than a preset congestion threshold, determine an instruction for instructing to switch a data transmission channel to a wireless local area network as the data request processing instruction.

The second sending module 1004 is configured to send the data request processing instruction to the sending party.

Figure 11:
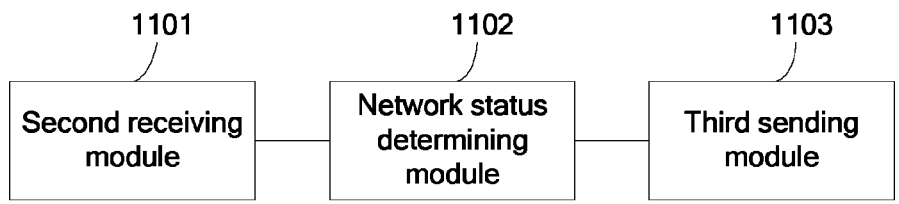
FIG. 11 is a schematic structural diagram of still yet another data request processing apparatus based on a wireless communications network according to an embodiment of the present invention.

As shown in FIG. 11, yet still another data request processing apparatus based on a wireless communications network according to an embodiment is applied to a PCRF in the wireless communications network and may include: a second receiving module 1101, configured to receive a service quality request message, where the service quality request message is sent from a sending party when the sending party receives a data request message of a terminal; a network status querying module 1102, configured to query a current network status according to the service quality request message; and a third sending module 1103, configured to send the current network status to the sending party.

Figure 12:
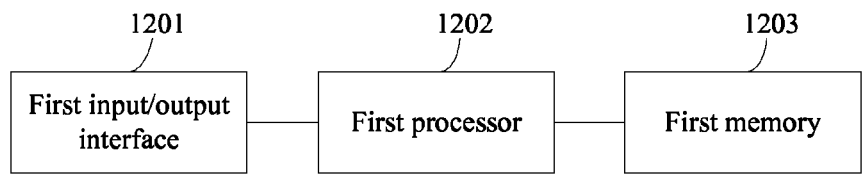
FIG. 12 is a schematic structural diagram of a communications device according to an embodiment of the present invention.

An embodiment of the present invention further discloses a communications device. As shown in FIG. 12, the communications device includes: a first input/output interface 1201, configured to send a service quality request message to a policy and charging rules function (PCRF) entity when a data request message of a terminal is received; a first processor 1202, configured to acquire a data request processing instruction, where the data request processing instruction is determined according to a current network status and the data request message, and the current network status is obtained by means of querying by the PCRF according to the received service quality request message; and process a data request message of the terminal according to the data request processing instruction; and a first memory 1203, configured to store a program in the first processor and data generated in a running process of the program.

Figure 13:
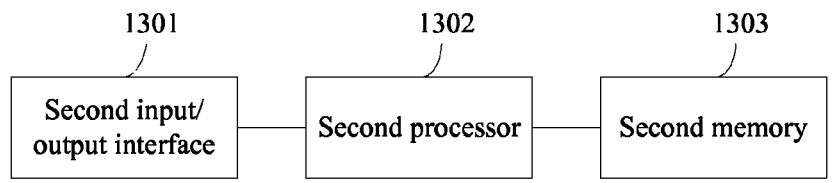
FIG. 13 is a schematic structural diagram of a policy and charging rules function entity according to an embodiment of the present invention.

An embodiment of the present invention further discloses a policy and charging rules function entity. As shown in FIG. 13, the policy and charging rules function entity includes: a second input/output interface 1301, configured to receive a service quality request message, where the service quality request message is sent from a sending party when the sending party receives a data request message of a terminal; a second processor 1302, configured to query a current network status according to the service quality request message, where the current network status is used to acquire a data request processing instruction, and the data request processing instruction is a basis for the sending party to process a data request message of the terminal; and a second memory 1303, configured to store a program in the second processor and data generated in a running process of the program.

When the functions of the methods in the embodiments are implemented in a form of a software functional unit and sold or used as an independent product, the functions may be stored in a computing device-readable storage medium. Based on such an understanding, the part of the embodiments of the present invention contributing to the prior art or some of the technical solutions may be implemented in a form of a software product. The software product is stored in a storage medium, and includes several instructions for instructing a computing device (which may be a personal computer, a server, a mobile computing device, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The embodiments in this specification are all described in a progressive manner, each embodiment focuses on a difference from other embodiments, and for same or similar parts in the embodiments, reference may be made to these embodiments.

The embodiments disclosed above are described to enable a person skilled in the art to implement or use the present invention. Various modifications to the embodiments are obvious to a person skilled in the art, and general principles defined in this specification may be implemented in other embodiments without departing from scope of the present invention, Therefore, the present invention is not intended to be limited to these embodiments illustrated in this specification, but shall be construed in the widest scope consistent with the principles and novel features disclosed in this specification.

What is claimed is:

1. A method by a data processing apparatus to control for controlling data transmission in a wireless communications network, comprising:
   controlling, by the data processing apparatus,
      sending a service quality request message to a policy and charging rules function (PCRF) entity, according to a received data request message for data, which indicates a first quality for the data, of a terminal;
      acquiring a data request processing instruction, the data request processing instruction indicating a second quality for the data determined according to a current network congestion status and the first quality for the data indicated in the data request message of the terminal, and the current network congestion status being obtained through querying by the PCRF according to the received service quality request message; and
      processing for the terminal the data request message of the terminal according to the acquired data request processing instruction to control transmission of the data according to the second quality of the data indicated in the determined data request processing instruction.

2. The method according to claim 1, wherein the acquiring the data request processing instruction comprises:
   receiving the data request processing instruction sent from the PCRF.

3. The method according to claim 1, wherein the acquiring the data request processing instruction comprises:
   receiving a message that indicates the current network congestion status and is sent from the PCRF; and
   determining the data request processing instruction according to the current network congestion status and a data bit rate parameter, which indicates the first quality for the data, that is carried in the data request message.

4. The method according to claim 3, wherein the determining the data request processing instruction according to the current network congestion status and the data parameter that is carried in the data request message comprises:
   if current network traffic of a cell in which the terminal is located is greater than a preset congestion threshold, determining an instruction for instructing to request data whose preset bit rate is less than the bit rate carried in the data request message, as the data request processing instruction.

5. The method according to claim 4, wherein when the instruction for instructing to request the data whose preset bit rate is less than the bit rate carried in the data request message is determined as the data request processing instruction, the processing the data request message of the terminal according to the data request processing instruction comprises:
   requesting, from a server, data whose bit rate is the preset bit rate; and
   forwarding the data whose bit rate is the preset bit rate to the terminal, wherein the data is sent from the server.

6. The method according to claim 3, wherein the determining the data request processing instruction according to the current network congestion status and the data parameter that is carried in the data request message comprises:
   if current network traffic of a cell in which the terminal is located is greater than a preset congestion threshold, determining an instruction for instructing to switch a data transmission channel to a wireless local area network, as the data request processing instruction.

7. A method by a policy and charging rules function (PCRF) entity implemented by an apparatus to control data transmission in a wireless communications network, comprising:
   by the PCRF entity of the apparatus,
      receiving a service quality request message, wherein the service quality request message is sent from a sending party when the sending party receives a data request message for data, which indicates a first quality for the data, of a terminal;
      querying a current network congestion status according to the service quality request message, the current network congestion status used to determine a data request processing instruction indicating a second quality for the data according to the queried current network congestion status and the first quality for the data indicated in the data request message of the terminal; and
      sending the data request processing instruction to the sending party to control the sending party to process the data request message for the terminal to control transmission of the data according to the second quality of the data indicated in the data request processing instruction.

8. The method according to claim 7, further comprising:
determining the data request processing instruction according to the current network congestion status and a data bit rate parameter, which indicates the first quality for the data, that is carried in the data request message sent from the sending party; and
sending the data request processing instruction to the sending party.

9. The method according to claim 8, wherein the determining the data request processing instruction according to the current network congestion status and the data parameter that is carried in the data request message sent from the sending party comprises:
if current network traffic of a cell in which the terminal is located is greater than a preset congestion threshold, determining an instruction for instructing to request data whose preset bit rate is less than a bit rate carried in the data request message as the data request processing instruction.

10. The method according to claim 8, wherein the determining the data request processing instruction according to the current network congestion status and the data parameter that is carried in the data request message sent from the sending party comprises:
if current network traffic of a cell in which the terminal is located is greater than a preset congestion threshold, determining an instruction for instructing to switch a data transmission channel to a wireless local area network as the data request processing instruction.

11. A data processing apparatus in a wireless communications network, comprising:
at least one processor configured to,
send a service quality request message to a policy and charging rules function (PCRF) entity, according to a received data request message for data, which indicates a first quality for the data, of a terminal is received;
acquire a data request processing instruction, the data request processing instruction indicating a second quality for the data determined according to a current network congestion status and the first quality for the data indicated in the data request message of the terminal, and the current network congestion status being obtained through querying by the PCRF according to the received service quality request message; and
process for the terminal the data request message of the terminal according to the data acquired request processing instruction to control transmission of the data according to the second quality of the data indicated in the determined data request processing instruction.

12. The apparatus according to claim 11, wherein the at least one processor is further configured to receive the data request processing instruction sent from the PCRF.

13. The apparatus according to claim 11, wherein the at least one processor is further configured to,
receive a message that indicates the current network congestion status and is sent from the PCRF; and
determine the data request processing instruction according to the current network congestion status and a data bit rate parameter, which indicates the first quality for the data, that is carried in the data request message.

14. The apparatus according to claim 13, wherein the at least one processor is further configured to:
if current network traffic of a cell in which the terminal is located is greater than a preset congestion threshold, determine an instruction for instructing to request data whose preset bit rate is less than a bit rate carried in the data request message as the data request processing instruction.

15. The apparatus according to claim 14, wherein the at least one processor is further configured to,
when the instruction for instructing to request the data whose preset bit rate is less than the bit rate carried in the data request message is determined as the data request processing instruction, request, from a server, data whose bit rate is the preset bit rate; and configured to forward the data whose bit rate is the preset bit rate to the terminal by using a gateway, wherein the data is sent from the server.

16. The apparatus according to claim 13, wherein the at least one processor is further configured to, if current network traffic of a cell in which the terminal is located is greater than a preset congestion threshold, determine an instruction for instructing to switch a data transmission channel to a wireless local area network as the data request processing instruction.

17. A data processing apparatus in a wireless communications network to implement a policy and charging rules function (PCRF) entity in the wireless communications network, the apparatus comprising:
at least one processor configured to,
receive a service quality request message, wherein the service quality request message is sent from a sending party when the sending party receives a data request message for data, which indicates a first quality for the data, of a terminal;
query a current network congestion status according to the service quality request message, the current network congestion status used to determine a data request processing instruction indicating a second quality for the data according to the queried current network congestion status and the first quality for the data indicated in the data request message of the terminal; and
sending the data request processing instruction to the sending party to control the sending party to process the data request message for the terminal to control transmission of the data according to the second quality of the data indicated in the data request processing instruction.

18. The apparatus according to claim 17, wherein the at least one processor is further configured to,
determine the data request processing instruction according to the current network congestion status and a data bit rate parameter, which indicates the first quality for the data, that is carried in the data request message sent from the sending party; and
send the data request processing instruction to the sending party.

19. The apparatus according to claim 18, wherein the at least one processor is further configured to, if current network traffic of a cell in which the terminal is located is greater than a preset congestion threshold, determine an instruction for instructing to request data whose preset bit rate is less than the bit rate carried in the data request message as the data request processing instruction.

20. The apparatus according to claim 18, wherein the at least one processor is further configured to, if current network traffic of a cell in which the terminal is located is greater than a preset congestion threshold, determine an instruction for instructing to switch a data transmission channel to a wireless local area network as the data request processing instruction.

* * * * *

UNITED STATES PATENT AND TRADEMARK OFFICE
CERTIFICATE OF CORRECTION

PATENT NO. : 9,961,590 B2
APPLICATION NO. : 14/950049
DATED : May 1, 2018
INVENTOR(S) : Anni Wei et al.

It is certified that error appears in the above-identified patent and that said Letters Patent is hereby corrected as shown below:

In the Claims

Column 15, Line 48-49, In Claim 1, delete "to control for controlling" and insert -- to control --, therefore.

Signed and Sealed this
Nineteenth Day of June, 2018

Andrei Iancu
*Director of the United States Patent and Trademark Office*